United States Patent
Haley et al.

(10) Patent No.: US 11,890,808 B2
(45) Date of Patent: Feb. 6, 2024

(54) IN-SITU DIGITAL IMAGE CORRELATION AND THERMAL MONITORING IN DIRECTED ENERGY DEPOSITION

(71) Applicant: UT-Battelle, LLC, Oak Ridge, TN (US)

(72) Inventors: James Haley, Oak Ridge, TN (US); Ryan Dehoff, Oak Ridge, TN (US); Vincent C. Paquit, Oak Ridge, TN (US); Samuel C. Leach, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 241 days.

(21) Appl. No.: 17/124,569

(22) Filed: Dec. 17, 2020

(65) Prior Publication Data
US 2022/0193990 A1 Jun. 23, 2022

(51) Int. Cl.
*B29C 64/153* (2017.01)
*B29C 64/386* (2017.01)
(Continued)

(52) U.S. Cl.
CPC .......... *B29C 64/153* (2017.08); *B23K 26/034* (2013.01); *B29C 64/386* (2017.08); *G06T 7/001* (2013.01); *G06T 7/40* (2013.01); *G06T 7/74* (2017.01); *G06T 7/75* (2017.01); *G06T 7/80* (2017.01); *B33Y 10/00* (2014.12); *B33Y 30/00* (2014.12)

(58) Field of Classification Search
CPC ............ G01N 2021/479; B29C 64/153; B29C 64/386; G06T 7/80; G06T 2207/10048; G06T 2207/10012; G06T 2207/30164; B23K 26/034; B33Y 10/00; B33Y 30/00; B22F 10/25; B22F 10/85; B22F 12/90

USPC ..................................................... 219/121.83
See application file for complete search history.

(56) References Cited

U.S. PATENT DOCUMENTS

2009/0206065 A1     8/2009   Kruth et al.
2020/0110025 A1*    4/2020   Yacoubian ......... G01N 21/4788

FOREIGN PATENT DOCUMENTS

EP            3646968 A1     5/2020

OTHER PUBLICATIONS

Xie, Ruishan, et al. "In-situ observation and numerical simulation on the transient strain and distortion prediction during additive manufacturing." Journal of Manufacturing Processes. 38 (2019): 494-501.

(Continued)

*Primary Examiner* — John J Norton
*Assistant Examiner* — Simpson A Chen
(74) *Attorney, Agent, or Firm* — WARNER NORCROSS + JUDD LLP

(57) ABSTRACT

A method and a system for digital image correlation and thermal monitoring during directed energy deposition are provided. The method and the system include global off-axis 3D mapping of surfaces features at high frame rates using the natural surface roughness of the additive build. Infrared thermography is projected onto these surface features to record the thermo-mechanical history of the finished component. As set forth herein, the method and the system provide a low-cost solution to monitoring and optimizing the unique temporal artifacts induced by complex scan strategies.

9 Claims, 7 Drawing Sheets
(1 of 7 Drawing Sheet(s) Filed in Color)

(51) Int. Cl.
  *G06T 7/80* (2017.01)
  *B23K 26/03* (2006.01)
  *G06T 7/40* (2017.01)
  *G06T 7/73* (2017.01)
  *G06T 7/00* (2017.01)
  *B33Y 30/00* (2015.01)
  *B33Y 10/00* (2015.01)

(56) References Cited

OTHER PUBLICATIONS

Biegler M., et al. "In-situ distortions in LMD additive manufacturing walls can be measured with digital image correlation and predicted using numerical simulations." Additive Manufacturing, 20 (2018): 101-110.

* cited by examiner

IN-SITU DIGITAL IMAGE CORRELATION AND THERMAL MONITORING IN DIRECTED ENERGY DEPOSITION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to directed energy deposition, and more particularly, in situ image correlation and thermal monitoring in directed energy deposition.

BACKGROUND OF THE INVENTION

Directed energy deposition (DED) is a form of additive manufacturing (AM) that permits rapid fabrication of metallic components that can meet wrought strength while permitting unprecedented geometric design flexibility. In DED, material is deposited by injecting material in powder or wire form into a melt pool formed by a focused laser. This melt pool is scanned in a pattern according to a toolpath instruction set to fill sequential cross-sections object being printed. Because this process uses a localized heat source to create the melt pool, the deposited material undergoes non-uniform heating and cooling, which introduce spatially localized residual strain fields from thermal expansion and contraction. These strains can lead to a number of problems, including 1) large unanticipated deformations exceeding design tolerances, 2) decoupling of expected and real part location, and 3) hot and cold work introducing material property changes.

The severe consequences of these non-uniformities have motivated a broad field of research to improve the capabilities of DED. These capabilities can be divided into four categories: (1) point measurements such as thermocouples or strain gauges, (2) integrated measurements such as acoustic or photonic emission monitoring, (3) local melt pool measurements such as coaxial thermal and multispectral imaging, and (4) global measurements such as a thermal camera viewing the entire part. While the first three capabilities have been put to many successful uses, such techniques do not have the combination of spatiotemporal identity necessary to provide the history and long-term interaction of individual geometrical features with repeated thermal cycling.

In contrast, global off-axis imaging can provide direct information about deformation and temperature during the printing process. Two established techniques permit these aims: stereo digital image correlation (DIC) and infrared imaging. Stereo DIC is commonly used as a non-contact, high fidelity deformation measurement system for mechanical testing. Infrared imaging can use emitted blackbody radiation to estimate surface temperatures from a distance. However, these technologies are inherently limited in several ways that previously have limited their direct application to AM.

The first limitation arises from the requirement that DIC requires visible features to track, whereas in an additively manufactured part being built in-situ, no part exists at the beginning of the build. The second limitation arises from the use of metallic particles in the build. As metallic particles reflect light specularly instead of diffusely, different illumination angles result in different observed surface patterns. A third limitation arises from the requirement of needing a reference state to calculate strains. As material is constantly being deposited, there is no single starting time frame to use for this reference. A fourth limitation is associated with the limitations of infrared imaging for temperature measurement. While raw infrared intensity provides a good sense of what material is hot and cold, quantitative thermography from a single spectrum requires some assumption of emissivity. Using a constant value for an additively manufactured part can be a poor estimate, as there are large differences in surface roughness and view angle, which produce intensity variations on the order of 20% of the measured intensity value.

Accordingly, there remains a continued need for a method of measuring deformation and temperature during the DED printing process that overcomes these and other limitations of existing in-situ monitoring systems. In particular, there remains a continued need for a geometrically arbitrary in situ method for DED printing processes to detect and correct for undesired deformations and performance-limiting defects.

SUMMARY OF THE INVENTION

A method and a system for digital image correlation and thermal monitoring during directed energy deposition are provided. The method and the system include global off-axis 3D mapping of surfaces features at high frame rates using the natural surface roughness of the additive build. Infrared thermography is projected onto these surface features to record the thermo-mechanical history of the finished component. As set forth herein, the method and the system provide a low-cost solution to monitoring and optimizing the unique temporal artifacts induced by complex scan strategies, without processing pauses found in other proposed solutions to the foregoing problems.

In one embodiment, the method includes acquiring, during directed energy deposition of an additive build, image frame data of the additive build. The image frame data is acquired from a stereo-pair of imaging cameras that are off-axis with respect to a laser and nozzle assembly. The method includes mapping surface features of the additive build, including both outer and inner surface features, using the natural surface roughness of the additive build, and without the application of a speckle pattern. For outer surface features, for example external wall structures, the mapped features are recorded in a reference frame that is determined from an image frame of the completed build. For inner surface features, for example internal wall structures that become obscured from view, the mapped features are recorded in a synthetic reference frame. The method can include determining strain data for the mapped features and assigning a temperature value for each feature based on the output of an infrared camera.

In another embodiment, the system includes a directed energy deposition system, a machine vision system, and a control unit. The directed energy deposition system includes a laser unit positioned above a build platform and includes a material deposition nozzle for depositing a material onto a melt pool formed by the laser beam. The machine vision system includes at least one sensor unit comprising an infrared camera and a stereo pair of imaging cameras. The control unit is coupled to the output of the machine vision system and is operable to extract, from the output of the imaging cameras, position data of a surface feature of the component using the natural surface roughness of the component without an applied speckle pattern. The imaging cameras define a stereo angle of between 5 and 10 degrees, inclusive, and the infrared camera is interposed between the first and second imaging cameras. The imaging cameras are operable to image visible light with a wavelength of between 440 nm and 555 nm, and the machine vision system can include a light source for providing imaging light during the additive build. The control unit is further operable to determine a strain in the additive build and operable to control a processing parameter, monitor a process parameter, or validate a simulation.

Using the above method and system, the present invention provides a significantly richer data set than previously possible. The thermal and strain history of each location on any visible structure of an additive build is observed and analyzed for irregularities in real time. With multiple view points stitched together, the unique behavior of complex geometries and the convoluted scan strategies used to fabricate them can be monitored for undesirable deformations that produce build failure, scrap, and performance-limiting defects. These and other features of the invention will be more fully understood and appreciated by reference to the description of the embodiments and the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE CURRENT EMBODIMENTS

As discussed herein, the current embodiments are directed to a method and a system for digital image correlation and thermal monitoring during directed energy deposition. The method includes off-axis 3D mapping of surfaces features at high frame rates using the natural surface roughness of an additive build. The system includes a machine vision system comprising multiple sensing units, each having an infrared camera and a stereo pair of imaging cameras. A control unit is coupled to the output of the machine vision system and extracts position data of a surface feature of the component using the natural surface roughness of the component without an applied speckle pattern.

More particularly, the method according to one embodiment includes: (a) providing a machine vision system including an infrared camera and a stereo pair of imaging cameras; (b) forming an additive build according to a directed energy deposition process, the additive build having a natural surface roughness; (c) acquiring image frame data of the additive build based on the output of the machine vision system; and (d) using the natural surface roughness of the additive build, extracting position data of a feature of the additive build from the image frame data. Each step is separately discussed below.

Figure 1:
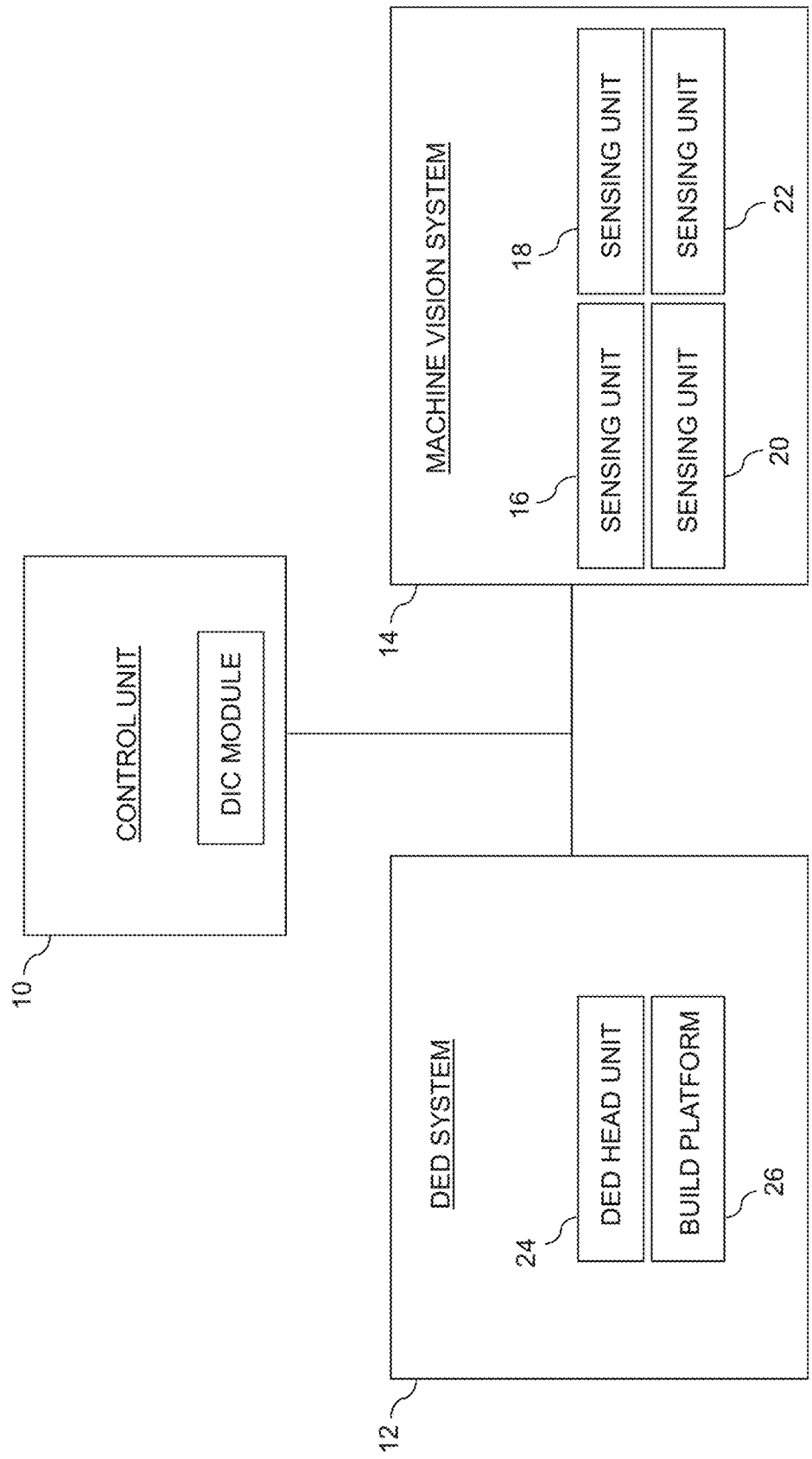
FIG. 1 is a block diagram for a system of digital image correlation and thermal monitoring during directed energy deposition.
Figure 2:
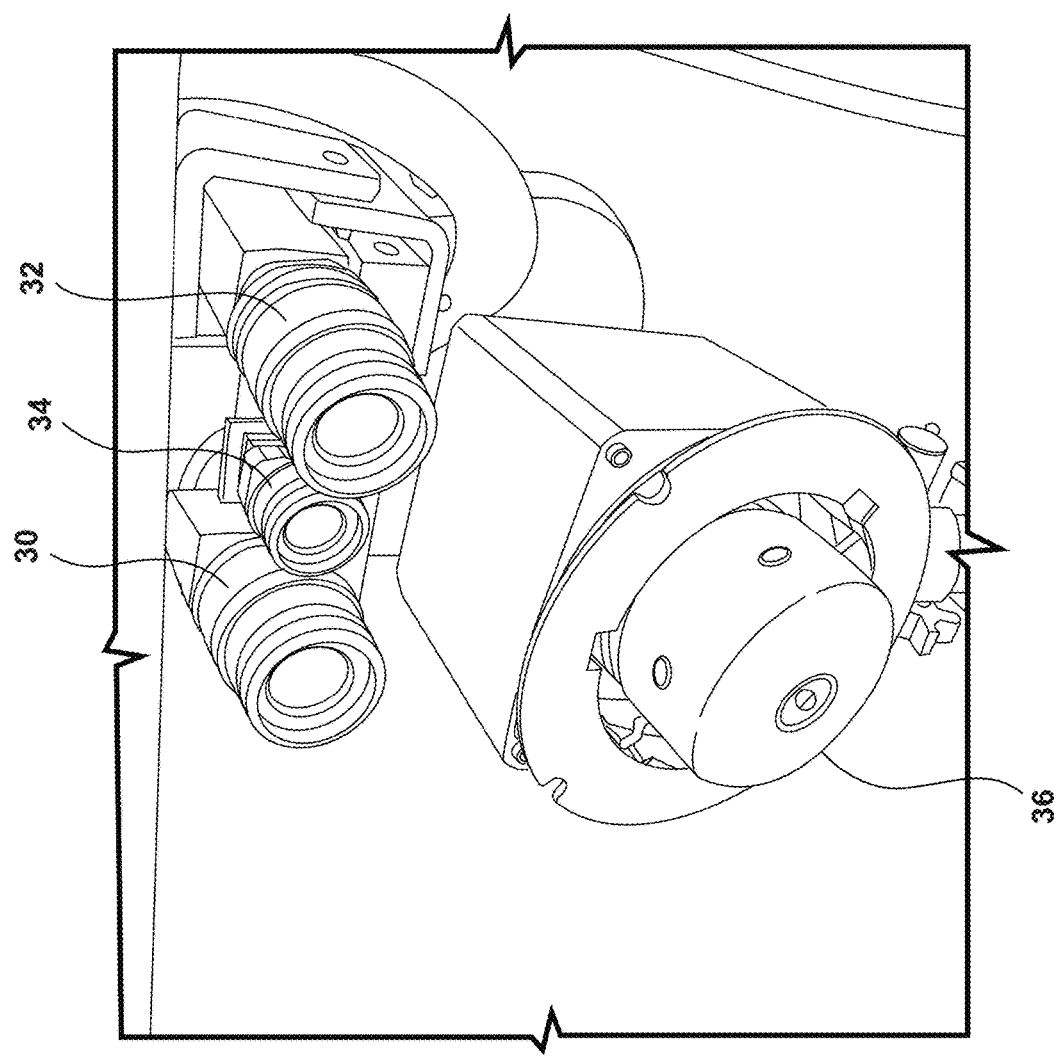
FIG. 2 is a perspective view of a sensing unit including an infrared camera, a stereo pair of imaging cameras, and strobe and LED light sources.

Providing a machine vision system generally includes providing at least one sensing unit comprising a stereo pair of imaging cameras and an infrared camera to provide off-axis imaging of an additive build during directed energy deposition. As shown in FIG. 1 for example, the overall system architecture includes a control unit 10 coupled to a directed energy deposition system 12 and a machine vision system 14. The machine vision system 14 includes multiple sensing units 16, 18, 20, 22 each having an infrared camera and a stereo pair of imaging cameras that are operable to image visible light with a wavelength of between 440 nm and 555 nm. As optionally shown in FIG. 2, each sensing unit includes a stereo pair of imaging cameras 30, 32 defining a stereo angle of less than thirty degrees, optionally between 5 and 10 degrees, inclusive, with the infrared camera 34 being disposed between the stereo pair of imaging cameras 30, 32. The sensing unit includes a light source 36 that is fixed in relation to the stereo pair of imaging cameras 30, 32 for providing imaging light to the additive building during directed energy deposition. Though four sensing units are shown in FIG. 1, the machine vision system 14 can include additional sensing units to provide global coverage of the additive build.

The step of forming an additive build generally includes positioning a laser deposition head 24 above a build platform 26. In the illustrated embodiment, the laser deposition head 24 includes a laser, a material deposition nozzle, and a port for a shielding gas that is blown through the nozzle coaxially with the laser beam. The build platform 26 is a rotatable fixture, with the sensing units being oriented toward the build platform 26 with overlapping fields of view to provide global coverage of the three-dimensional additive build. During directed energy deposition, powdered metal (e.g., SS316L) is jetted around the focus of a laser beam and melts into liquid form as it is being deposited. Each pass of the laser deposition head 24 creates a track of solidified material, and adjacent lines of material make up layers. While described in relation to powder-based systems, other embodiments include a wire feed. The additive build (which as used herein encompasses the partial build and the completed build) includes surface features having natural surface roughness that can be detected and processed during in-situ digital image correlation.

The step of acquiring image frame data of the additive build generally includes imaging the additive build during directed energy deposition and outputting the resulting frame data to a control unit 10 for digital image correlation using only the natural surface roughness of the additive build. This method step is performed by the sensor units of the machine vision system, which provide off-axis imaging of outer surfaces and inner surfaces of the additive build. The inner surfaces becomes occluded by the outer surface during the build, but as discussed below, strain data for the inner surfaces can be determined in a synthetic reference frame at the conclusion of the build.

Figure 3:
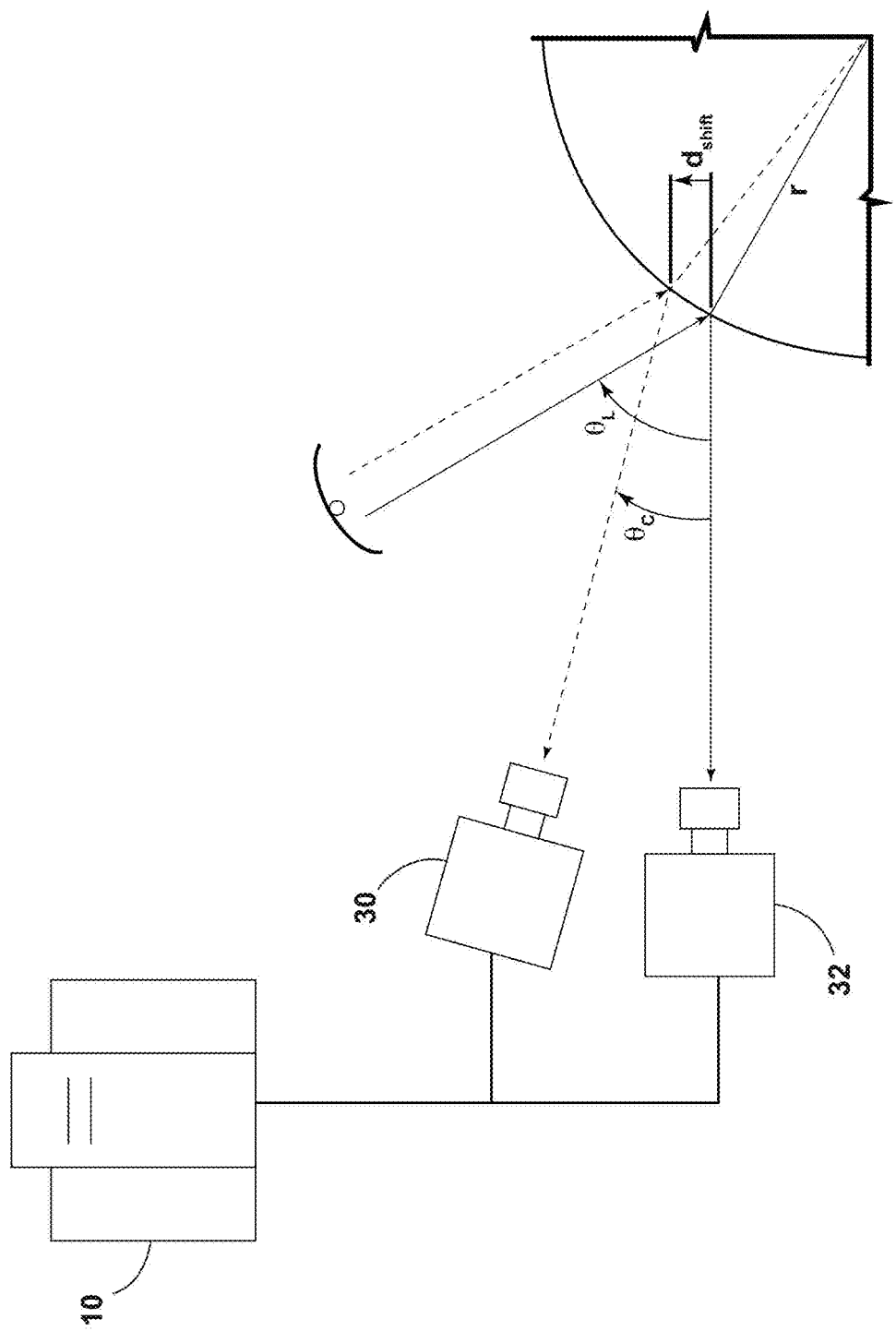
FIG. 3 is a schematic diagram illustrating the shift in particle position ($d_{shift}$) as a geometric function for spherical and cylindrical samples.

The step of extracting position data of a feature of the additive build from the image frame data is performed in the control unit and includes performing digital image correlation (DIC) using the natural surface roughness of the additive build, without an applied speckle pattern (e.g., painted or printed pattern). DIC can provide strain data for the external surface features and internal surface features of the additive build, and the change in shape of the additive build can be accurately calculated. For reflective surfaces, contrast is generated primarily through differences in specular reflection due to variation in the incident angle between the illumination source, the target surface, and the camera. One underlying assumption of DIC is that the target's unique speckle pattern reflects light diffusely, allowing for the pattern to be identified from multiple viewing and illumination angles through homographic transformations. This is violated to a degree when using natural surface roughness of DED components, as contrast is generated primarily through variations in specular reflection off of surface features. As the camera and illumination angle changes, the apparent position of the specular highlight on rounded features shifts. For spherical and cylindrical samples, this can be expressed with a geometric function according to equation (1) below, where $d_{shift}$ is the apparent shift in particle position, r is the radius of the shiny roughness feature, and $\theta_C$ and $\theta_L$ are the differences in camera view angle and illumination angle from the reference camera, similar to the setup in FIG. 3.

$$d_{shift} = r\left(\sin\left(\frac{\theta_C - \theta_L}{2}\right) - \sin\left(\frac{\theta_L}{2}\right)\right) \quad (1)$$

From this equation, several design principles to minimize distortion due to speckle shift can be expressed. First, correlation accuracy will vary directly with the size of roughness features observed, and correlation quality will vary directly with the dispersion of feature size. For example, correlation quality was found to degrade in areas where contrast is primarily driven by layer to layer 'scalloping' (~200 µm) as opposed to regions where contrast is driven by powder particles (~70 µm). Second, error from specular speckle shift does not depend strongly on the angle of illumination; therefore illumination angles can be chosen freely to highlight the smallest, highest contrast surface features. Third, correlation error from speckle shift depends strongly on camera stereo angle. This, combined with the possibility of the intensity of reflections off of powder particles changing intensity drives design to use very low camera stereo angles. This competes directly with conventional DIC practice of using higher (30-45°) stereo angles, which helps to mitigate depth measurement error. In practice, the system achieves Z-depth correlation quality of 10-25 µm (as opposed to 3-10 µm for X and Y), which for many applications is an acceptable tradeoff.

Figure 4:
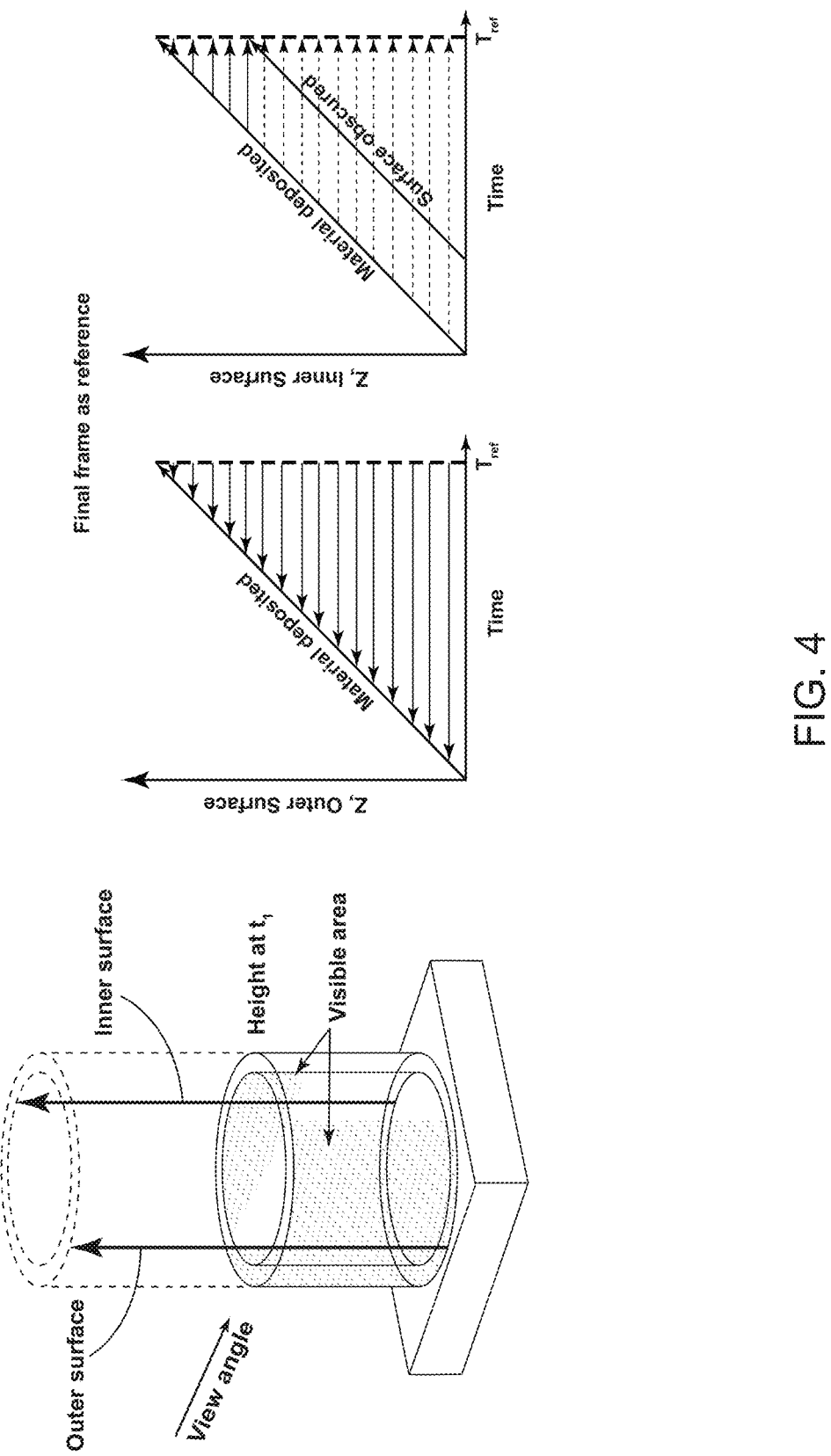
FIG. 4 is a comparison of reference frames for in-situ digital image correlation for an additive build using the final frame as a reference.

Unlike traditional DIC measurements, there exists no part at the beginning of the additive build, so it is not possible to obtain a zero strain reference frame. To overcome this challenge, a reference frame is generated for strain measurements using image frame data after the directed energy deposition process has completed, shown in FIG. 4. For inner surface components, a synthetic reference frame is constructed as material is deposited using image segmentation, also shown in FIG. 4. The inner surfaces that are only briefly visible can be reconstructed and inspected for strain and potential detects in the synthetic reference frame. Further with respect to the inner surfaces, the control unit includes machine readable logic that identifies the pixels within the image frame data that contain printed walls, forming an image mask, optionally with frame-to-frame subtraction and thresholding. The machine readable logic then identifies which wall each mask belongs to, makes a separate image layer for each wall, and stores each wall's image layer as a separate video stream. The machine readable logic then runs DIC on each wall's video stream separately, and always uses the prior frame of the wall's video as a reference frame. In this way, wall edges are excluded and do not contribute to DIC error. Measured deformations are relative, not absolute, and the present method allows measuring internal surfaces that were not previously measureable.

Figure 5:
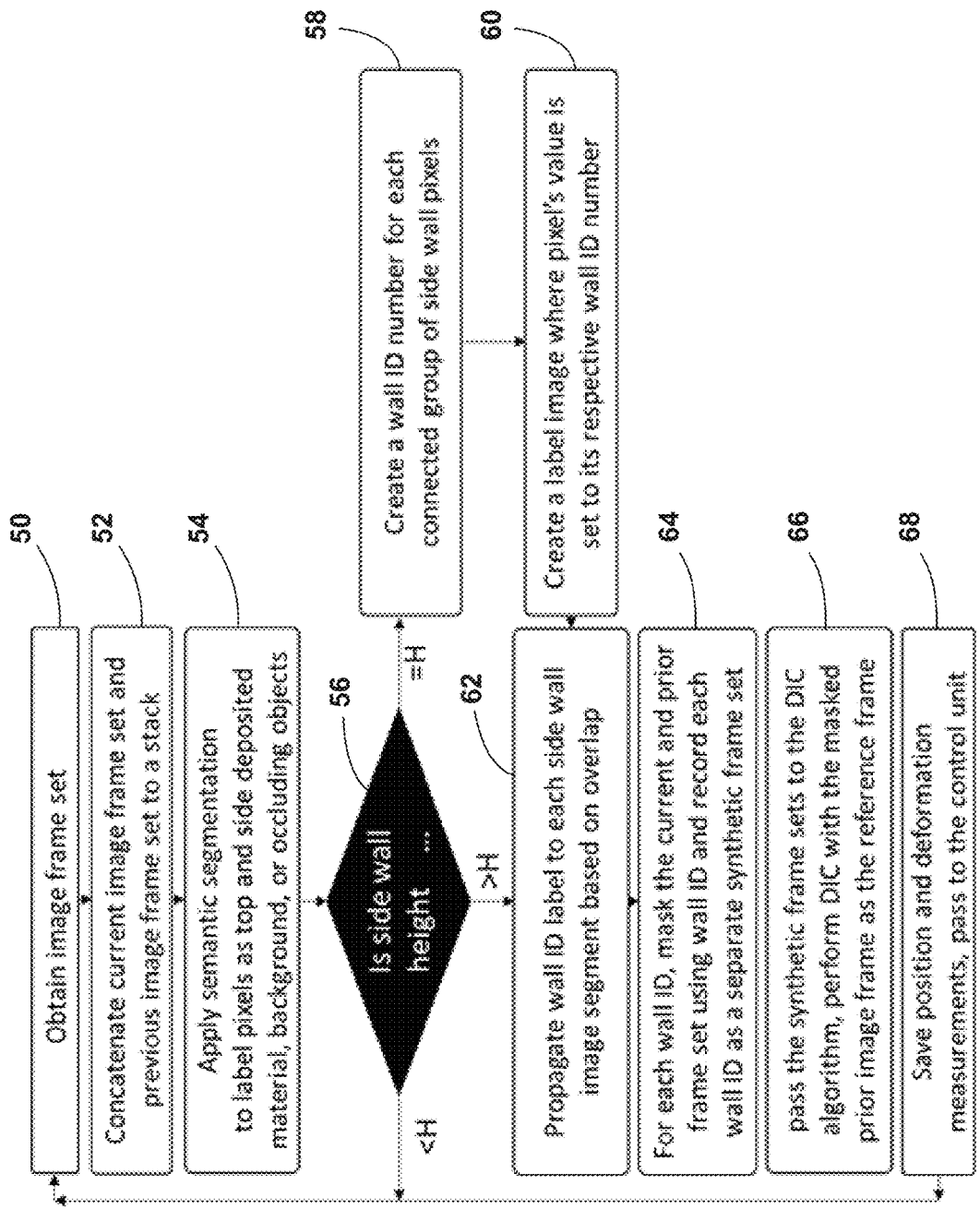
FIG. 5 is a flow-chart illustrating digital image correlation of an inner surface in accordance with one embodiment of the present invention.

Extracting position data from an inner surface feature using a synthetic reference frame is further illustrated in connection with the flow chart of FIG. 5. An image frame set (i.e., a single frame from each imaging camera at a single point in time) is captured at step 50. At step 52, machine readable logic concatenates the image frame set and the previous image frame to a stack. At step 54, the machine readable logic applies semantic segmentation to label pixels at top and side deposited material, material, or occluding objects. At decision step 56, the machine readable logic compares the wall height to a predetermined threshold (H), the predetermined threshold (H) being a measured dimension of grouping of pixels in the build direction. If the wall height is less than the predetermined threshold (H), the machine readable logic reverts to step 50 and obtains a further image frame set. If the wall height is equal to the predetermined threshold (H), the machine readable logic creates a wall identifier for each connected group of side wall pixels at step 58 and creates a label image, where a pixel's value is set to its respective wall identifier at step 60. If the wall height is greater than the predetermined threshold (H), the machine readable logic propagates the wall identifier (created at step 60) to each side wall image segment based on overlap at step 62. For each wall identifier, the machine readable logic masks the current and prior frame set and records each wall identifier as a separate synthetic frame set at step 64. At step 66, the machine readable logic passes the synthetic frame set to a DIC module, which performs DIC with the masked prior image frame as the reference frame. At step 68, the DIC module saves the position and deformation measurements, which are passed to the control unit 10. The machine readable logic reverts to step 50 and obtains a further image frame set, with the foregoing measurements being performed at the frame rate of the imaging cameras, for example 20 Hz to 60 Hz.

To obtain the full thermomechanical history of printed parts, the emitted light signal from the infrared cameras are mapped to the 3D geometry produced from DIC. Using the determined strain data or thermomechanical history of the printed part, the control unit 10 can control one or more parameters of the directed energy deposition process, can detect a defect in the additive build, and/or can perform simulation validation.

EXAMPLE

Figure 6:
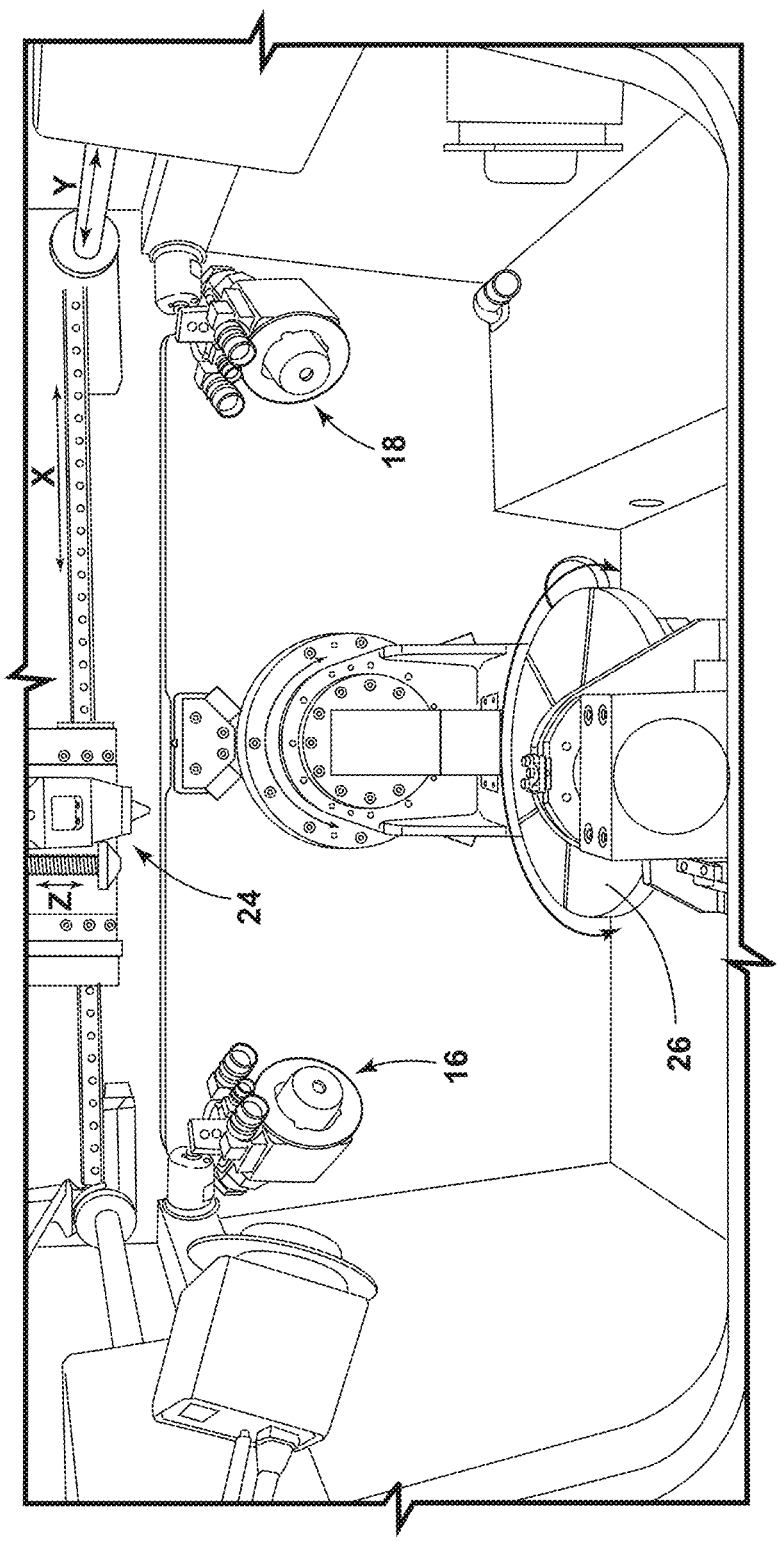
FIG. 6 is schematic diagram of a system for system of digital image correlation and thermal monitoring in accordance with a laboratory example.

An in-situ system in accordance with one example is depicted in FIG. 6 was installed in a BeAM Modulo 400 machine. The machine was outfitted with four sensing units, and illumination was provided in the four corners of the build chamber. Each of the four sensor units included (a) two 20 MP rolling shutter visible cameras capable of 18 Hz and spectrally filter to a 440-55 nm band with fixed focal length lenses, (b) a FLIR Boson microbolometer long-wave infrared camera with a resolution of 640×512 pixels, (c) a 320 J Xenon strobe, and (d) a 60 W white LED. The visible cameras and the strobe were capable of synchronous or asynchronous hardware triggering through a microcontroller. The temperature-intensity response for the FLIR Bosons with 14 mm and 18 mm lenses was calibrated using a blackbody furnace. Emissivity values for rough and AM SS316L surface were assumed constant at 0.3.

Figures 7A, 7B, 7C, 7D:
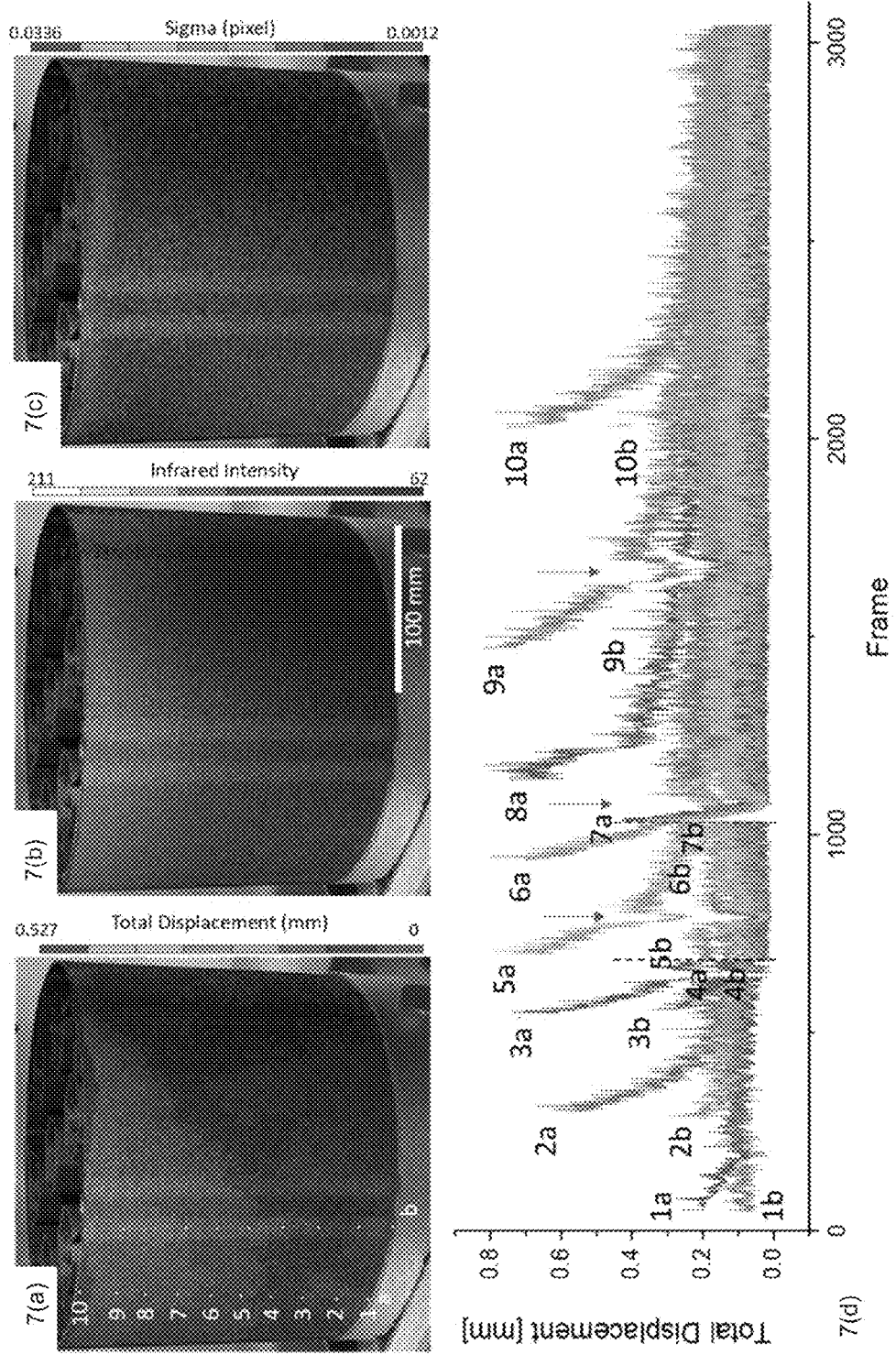
FIG. 7(a) illustrates in-situ digital image correlation measurement from a single perspective using the final frame as a strain reference and mapping total XYZ displacement from the final frame of the recording.
FIG. 7(b) illustrates 3D-mapped infrared intensity overlaid onto a visible image, showing heat concentration from prior deposition.
FIG. 7(c) illustrates correlation map quality showing an error estimate ranging up to 0.034 pixels.
FIG. 7(d) is a graph illustrating total displacement over 40 hours of printing, with breaks in printing in dotted lines and pauses for powder refills in red arrows.

A demonstration prismatic containment structure made of SS316L and 220 mm in diameter was printed and recorded for analysis. An image from one camera system with overlaid DIC results is shown in FIGS. 7(a)-7(c). In particular, FIG. 7(a) includes in-situ DIC measurements from a single perspective using the final frame in the video as a strain reference and mapping total XYZ displacement from the reference of the final frame of the recording. Inspection points are overlaid in FIG. 7(a). FIG. 7(b) includes 3D mapped infrared intensity that is overlaid on a visible image, showing heat concentration from prior disposition at the large interior pockets. FIG. 7(c) includes correlation map quality, showing an error estimate ranging up to 0.034 pixels (12.1 µm in the Z direction). The inspection points are plotted in FIG. 7(d), showing the total displacement over 40 hours of printing. Two breaks in the recording for data transfer are labeled in broken lines, and three pauses for printing refills are labeled with red errors.

Object emissivity was measured by comparing intensity readings during printing to a thermocouple attached to the substrate. Good agreement between the thermocouple and the IR camera was found when the substrate's emissivity was set to 0.19; if the substrate were assumed to be uniformly emissive and the deposited material directly adjacent to the substrate were assumed to be the same temperature, then the measured emissivity of printed surfaces near the substrate is found to be ~0.23-0.25.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method comprising:
providing a machine vision system including an infrared camera and a stereo pair of imaging cameras for imaging visible light;
additively manufacturing a component by depositing a material in successive layers in a directed energy deposition process;
acquiring, during the additively manufacturing step, image frame data of the component based on the output of the machine vision system, the image frame data including a plurality of image frames taken of the component during the directed energy deposition process;
extracting, from the image frame data, position data of a surface feature of the component as a function of time, wherein the surface feature is internally-facing and becomes obscured during the additive manufacture of the component, and wherein the position data of the internally-facing surface feature includes coordinates in a synthetic reference frame, wherein the synthetic reference frame is a reconstructed reference frame, the position data being extracted based on a natural surface roughness of the surface feature without a speckle pattern being applied to the surface feature, such that the surface feature is identified and tracked by the machine vision system over time; and
determining a strain within the component based on a change in the position data of the internally-facing surface feature over time in the synthetic reference frame.

2. The method of claim 1 further including controlling a processing parameter of the directed energy deposition process based on the determined strain within the component.

3. The method of claim 1 further including detecting a defect in the component during the directed energy deposition process based on the determined strain within the component.

4. The method of claim 1 further including performing simulation validation during the directed energy deposition process based on the determined strain within the component.

5. The method of claim 1 wherein the component further includes an externally-facing surface feature, and wherein the method further includes extracting position data of the externally-facing surface feature in a reference frame that is determined from an image frame of the completed component.

6. The method of claim 5 further including:
determining a further strain within the component based on a change in the position data of the externally-facing surface feature over time in the reference frame; and
controlling a processing parameter of the directed energy deposition process based on the determined further strain within the component.

7. The method of claim 6 further including detecting a defect in the component during the directed energy deposition process based on the determined further strain within the component.

8. The method of claim 6 further including performing simulation validation during the directed energy deposition process based on the determined strain within the component.

9. The method of claim 1 further including assigning a temperature value to the position data of the surface feature based on the output of the infrared camera.

* * * * *